United States Patent
Hoyer et al.

(10) Patent No.: US 10,988,176 B2
(45) Date of Patent: Apr. 27, 2021

(54) COMPONENT ALIGNMENT SYSTEM

(71) Applicant: GM GLOBAL TECHNOLOGY OPERATIONS LLC, Detroit, MI (US)

(72) Inventors: Eric B. Hoyer, White Lake, MI (US); Jacek Marchel, Rochester Hills, MI (US); Patrick Paquin, New Baltimore, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 16/415,509

(22) Filed: May 17, 2019

(65) Prior Publication Data

US 2020/0361532 A1    Nov. 19, 2020

(51) Int. Cl.
   *B62D 17/00*    (2006.01)
(52) U.S. Cl.
   CPC .................... *B62D 17/00* (2013.01)
(58) Field of Classification Search
   CPC .......... B62D 17/00; F16B 21/04; F16B 39/24; B23B 3/26; A63B 53/02
   USPC .................................................. 280/124.155
   See application file for complete search history.

(56) References Cited

U.S. PATENT DOCUMENTS

| | | | | |
|---|---|---|---|---|
| 5,484,161 | A * | 1/1996 | McIntyre | B60G 15/068 267/220 |
| 6,478,318 | B1 * | 11/2002 | Allman | B60G 3/265 280/86.751 |
| 7,607,668 | B2 * | 10/2009 | Dugandzic | B60G 13/003 280/124.147 |
| 9,073,577 | B2 * | 7/2015 | Croutcher | B60G 15/068 |
| 2008/0303196 | A1 * | 12/2008 | Lyew | B62D 17/00 267/33 |
| 2015/0084300 | A1 * | 3/2015 | Hopson | B62D 17/00 280/93.512 |

* cited by examiner

*Primary Examiner* — Faye M Fleming
(74) *Attorney, Agent, or Firm* — Quinn IP Law

(57) ABSTRACT

An exemplary system for aligning a relative position between two components includes a locating member and an alignment insert member configured to couple with the locating member. The alignment insert member includes a radially-extending tab. The radially-extending tab has a plurality of identifying markers to identify a radial position of the locating member. The locating member is rotatable within the alignment insert member to adjust a radial position of the locating member.

17 Claims, 6 Drawing Sheets

COMPONENT ALIGNMENT SYSTEM

INTRODUCTION

The present disclosure relates generally to an alignment system with interchangeable pins for adjusting caster and camber alignment of vehicle body components.

Typical vehicle component alignment designs utilize stationary pins for aligning the components, such as a top mount to a body, and do not allow for future adjustment of the alignment of the components.

SUMMARY

Embodiments according to the present disclosure provide several advantages. For example, the present disclosure provides systems for aligning vehicle body components using discrete alignment mechanisms and eccentric, offset, or acentric pins.

An alignment system according to the present disclosure, including at least one concentric alignment member having a concentric locator pin, at least one offset alignment member having an acentric locator pin and a locating member identifying a radial position of the acentric locator pin, and at least one alignment insert member configured to receive one of the at least one concentric alignment member and the at least one offset alignment member. The alignment insert member includes a radially-extending tab having a plurality of notches distributed radially along the tab, each of the plurality of notches configured to receive the locating member. The at least one concentric alignment member is interchangeable with the at least one offset alignment member, and the at least one offset alignment member is rotatable within the at least one alignment insert member to adjust a radial position of the acentric locator pin.

In exemplary embodiments, each of the plurality of notches of the radially-extending tab includes an identifying marker configured to identify a radial position of a notch of the plurality of notches such that engagement of the locating member within the notch establishes the radial position of the acentric locator pin of the offset alignment member.

In exemplary embodiments, the at least one alignment insert member includes a first alignment insert member configured to adjust a caster alignment and a second alignment insert member configured to adjust a camber alignment.

A vehicle suspension system according to the present disclosure includes an alignment system including a plurality of interchangeable alignment members and an alignment insert member configured to receive one of the plurality of interchangeable alignment members, the alignment insert member including a radially-extending tab having a plurality of notches distributed along the tab. The system also includes a first suspension component including an alignment opening configured to receive the alignment insert member, the alignment opening having a plurality of axial grooves formed on an interior surface of the alignment opening, each of the plurality of axial grooves aligned with one of the plurality of notches of the alignment insert member and a vehicle body component having at least one opening configured to receive one of the plurality of interchangeable alignment members. Each of the plurality of interchangeable alignment members is rotatable within the alignment insert member to adjust a position of the first suspension component relative to the vehicle body component.

In exemplary embodiments, the plurality of interchangeable alignment members includes a concentric alignment member, a first offset alignment member, and a second offset alignment member, the concentric alignment member including a concentric locator pin, the first offset alignment member including a first acentric locator pin and a first locating member identifying a position of the first acentric locator pin, and the second offset alignment member including a second acentric locator pin and a second locating member identifying a position of the second acentric locator pin.

In exemplary embodiments, the first locating member is an extension extending radially from an outer surface of the first offset alignment member and the second locating member is an extension extending radially from an outer surface of the second offset alignment member.

In exemplary embodiments, the alignment opening is a first alignment opening and the alignment insert member is a first alignment insert member and the first alignment opening is configured to receive the first alignment insert member, and the vehicle suspension system further comprises a second alignment insert member and the first suspension component includes a second alignment opening configured to receive the second alignment insert member.

In exemplary embodiments, the first alignment opening includes a plurality of first axial grooves formed on an interior surface of the first alignment opening and the second alignment opening includes a plurality of second axial grooves formed on an interior surface of the second alignment opening.

In exemplary embodiments, the first alignment insert member includes a first radially-extending tab having a plurality of first notches, each of the plurality of first notches including an identifying marker to identify the radial position of the notch and each notch aligns with a corresponding one of the plurality of first axial grooves of the first alignment opening.

In exemplary embodiments, the second alignment insert member includes a second radially-extending tab having a plurality of second notches, each of the plurality of second notches including an identifying marker to identify the radial position of the notch and each notch aligns with a corresponding one of the plurality of second axial grooves of the second alignment opening.

In exemplary embodiments, the plurality of interchangeable alignment members includes a concentric alignment member having a concentric locator pin, a first offset alignment member having a first acentric locator pin and a first locating member identifying a position of the first acentric locator pin, and a second offset alignment member having a second acentric locator pin and a second locating member identifying a position of the second acentric locator pin, the first locating member is an extension extending radially from an outer surface of the first offset alignment member and the second locating member is an extension extending radially from an outer surface of the second offset alignment member, and the first locating member engages with a notch of plurality of first notches to adjust a radial position of the first acentric locator pin and the second locating member engages with a notch of the plurality of second notches to adjust a radial position of the second acentric locator pin.

A system for aligning a relative position between two components, according to the present disclosure, includes a locating member; and an alignment insert member configured to couple with the locating member, the alignment insert member including a radially-extending tab having a plurality of identifying markers to identify a radial position of the locating member. The locating member is rotatable within the alignment insert member to adjust a radial position of the locating member.

In exemplary embodiments, the locating member is a guide cone and the alignment insert member includes a coupling portion and an adjustment portion opposite the coupling portion, wherein the adjustment position is configured to interface with the guide cone in one or more of a plurality of radial positions.

In exemplary embodiments, the guide cone includes an interior surface defining an opening configured to receive the alignment insert member and the adjustment portion of the alignment insert member includes a radially-extending edge surface including a plurality of notches identified by a plurality of identifying markers, each identifying marker corresponding to a desired position of the guide cone.

In exemplary embodiments, the guide cone includes a projection extending from the interior surface, the projection configured to interface with one of the plurality of notches of the alignment insert member.

In exemplary embodiments, the alignment insert member comprises a plurality of interchangeable alignment members and the plurality of interchangeable alignment members includes a concentric alignment member having a concentric locator pin, a first offset alignment member having a first acentric locator pin and a first locating member identifying a position of the first acentric locator pin, and a second offset alignment member having a second acentric locator pin and a second locating member identifying a position of the second acentric locator pin.

In exemplary embodiments, the first locating member is an extension extending radially from an outer surface of the first offset alignment member and the second locating member is an extension extending radially from an outer surface of the second offset alignment member.

In exemplary embodiments, the radially-extending tab of the alignment insert member includes a notch configured to receive one of the first and second locating members.

BRIEF DESCRIPTION OF THE DRAWINGS

The present disclosure will be described in conjunction with the following figures, wherein like numerals denote like elements.

Figure 1:
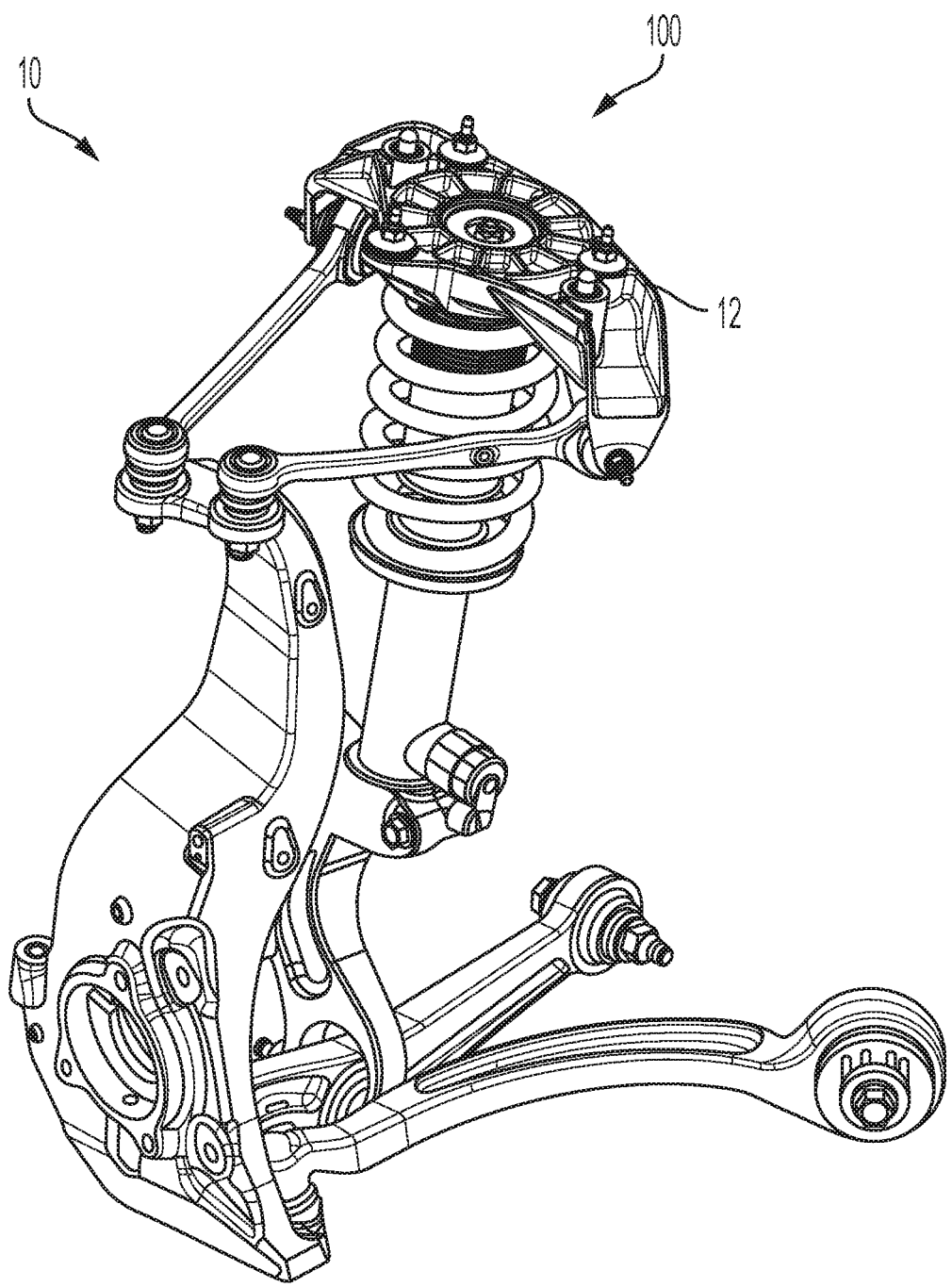
FIG. 1 is a schematic diagram of components of a vehicle suspension system according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIGS. 1-6 schematically illustrate a vehicle suspension system 10 including an alignment system 100 for adjusting the alignment of a vehicle suspension component coupled to a vehicle body component, according to an embodiment. In an exemplary embodiment, the alignment system 100 adjusts the relative position of a top mount 12 of a vehicle suspension coupled to a vehicle body component 14 (shown in FIG. 3).

Figure 2:
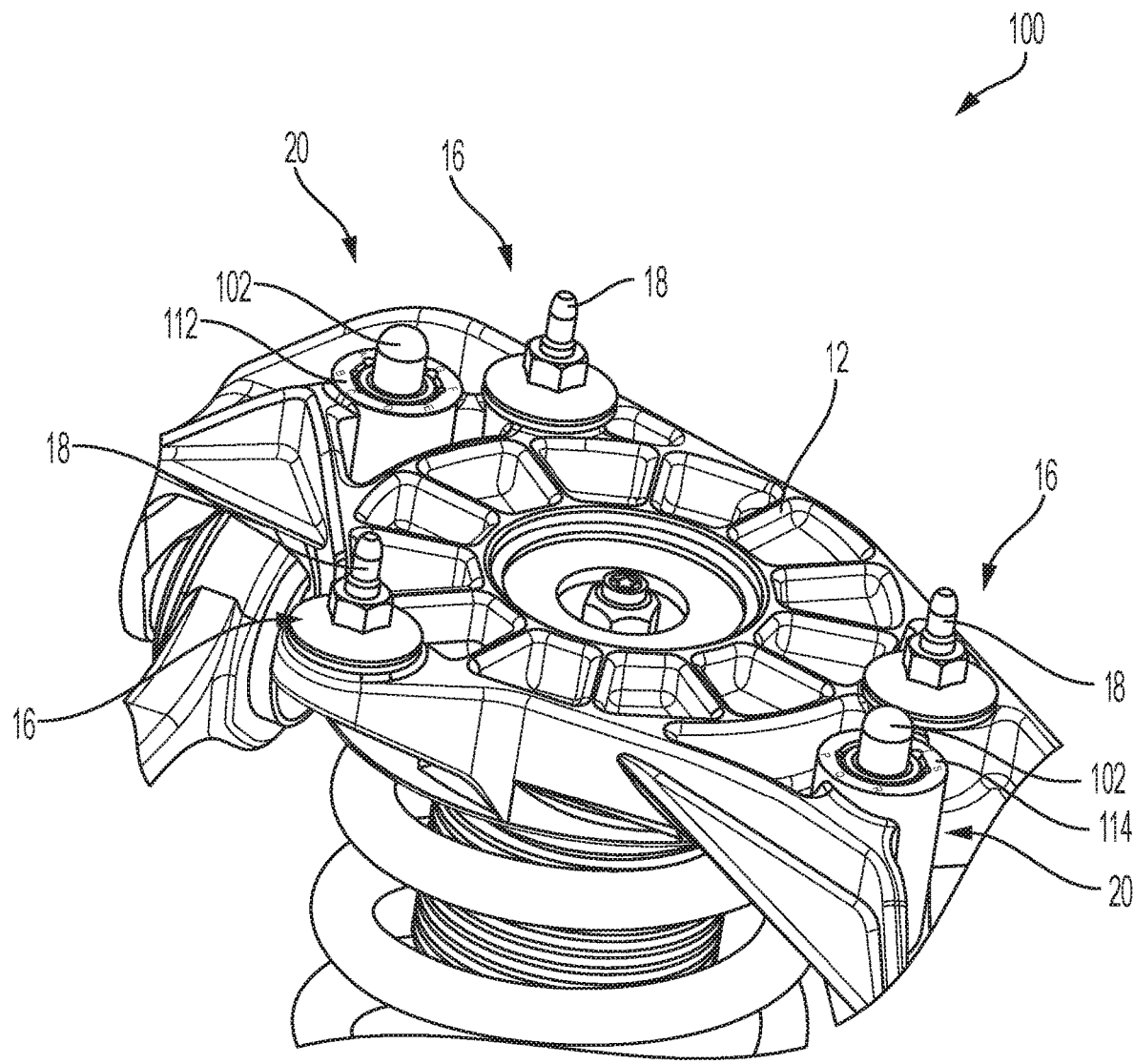
FIG. 2 is a schematic partial perspective view of a top mount of the vehicle suspension system of FIG. 1 illustrating components of an alignment system, according to an embodiment.
Figure 3:
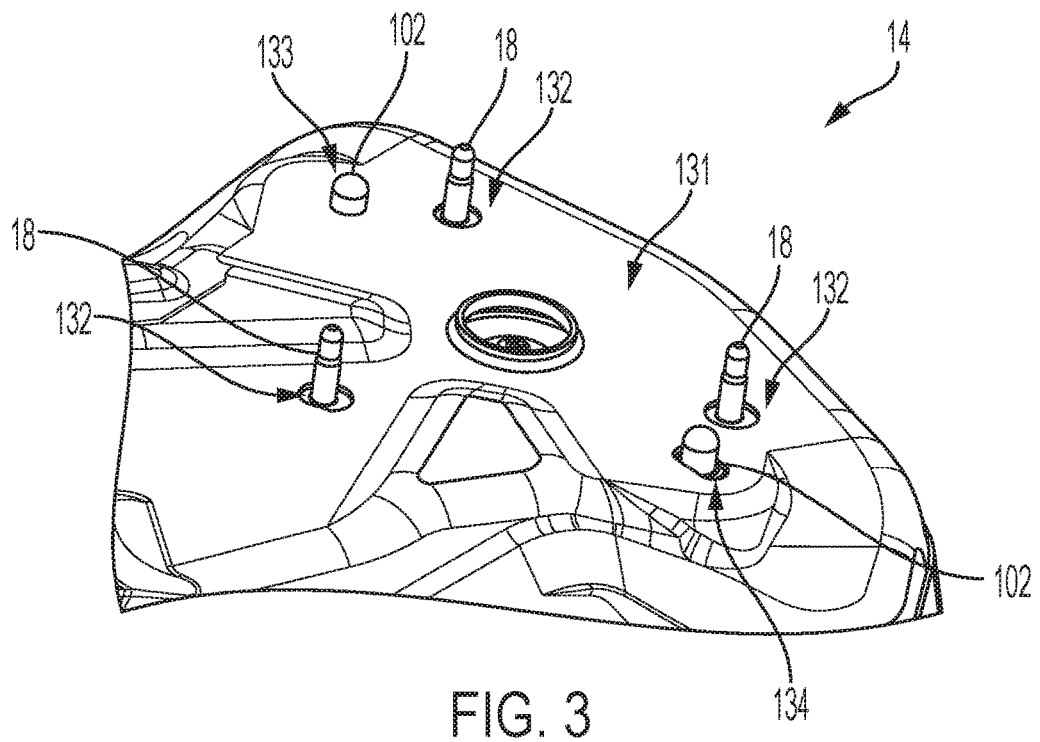
FIG. 3 is a schematic partial perspective view of a vehicle body component of the vehicle suspension system of FIG. 1, illustrating components of an alignment system, according to an embodiment.

Referring now to FIG. 2, a closer view of the top mount 12 illustrating the alignment system 100 is shown. The top mount 12 includes a plurality of attachment openings 16 and a plurality of alignment openings 20. In an exemplary embodiment, the top mount 12 includes three attachment openings 16 and two alignment openings 20. An attachment member 18 extends through each attachment opening 16. The attachment openings 16 are openings in the top mount 12 that are configured to receive the attachment member 18 such that the attachment member 18 extends above the surface of the top mount 12 to couple with a vehicle body component as shown in FIG. 3. In some embodiments, the attachment member 18 is seated within the attachment opening 16 using friction, adhesion, or any other attachment means. In some embodiments, the attachment member 18 is a stud.

The alignment system 100 includes at least one concentric alignment member 102. In various embodiments, the concentric alignment member 102 is a locating pin. The concentric alignment member 102 may be interchangeable with offset or acentric alignment members, discussed below, to adjust the relative position of the vehicle components.

The alignment system 100 further includes a first alignment insert member 112 and a second alignment insert member 114. The first alignment insert member 112 is seated within one of the alignment openings 20 and the concentric alignment member 102 extends through the first alignment insert member 112. Similarly, the second alignment insert member 114 is seated within another of the alignment openings 20 and the concentric alignment member 102 extends through the second alignment insert member 114. In some embodiments, the first and second alignment insert members 112, 114 are tabbed inserts that extend into and are adjacent to the interior surface of the alignment opening 20. The concentric alignment member 102 is removably and/or rotationally seated within the first alignment insert member 112 such that the first alignment insert member 112 is positioned between the concentric alignment member 102 and the interior surface of the alignment opening 20. Similarly, the concentric alignment member 102 is removably and/or rotationally seated within the second alignment insert member 114 such that the second alignment insert member 114 is positioned between the concentric alignment member 102 and the interior surface of the alignment opening 20. While FIG. 2 illustrates two concentric alignment members 102 seated within the first and second alignment insert members 112, 114, it is understood that this arrangement is merely one possibility given the interchangeability of the concentric and acentric components of the alignment system 100, as discussed herein.

With reference to FIG. 3, a portion of the vehicle body component 14 is shown attached to the top mount 12 (not shown). The vehicle body component 14 has a surface 131 that includes a plurality of edges defining a plurality of openings configured to receive the attachment members 18 and the concentric alignment members 102 (shown) or the acentric alignment members (not shown). As shown in FIG. 3, three openings 132 are configured such that the three attachment members 18 coupled to the top mount extend therethrough. Each of the openings 132 may be oversized such that the attachment member 18 is positionable within the opening 132; that is, the diameter of the opening 132 is larger than the diameter of the attachment member 18 to allow movement of the attachment member 18 within the opening 132 as the top mount 12 moves relative to the vehicle body component 14.

A first alignment opening 133 extends through the surface 131 such that the concentric alignment member 102 extends therethrough. In various embodiments, the first alignment opening 133 is configured such that the concentric alignment member 102 fits securely within the first alignment opening 133. Similarly, a second alignment opening 134 extends through the surface 131 such that the concentric alignment member 102 extends therethrough. In various embodiments, the second alignment opening 134 is configured as an elongated slot such that the concentric alignment member 102 may move within the second alignment opening 134 as the position of the top mount 12 is adjusted relative to the vehicle body component 14 as discussed in greater detail below. While FIG. 3 illustrates two concentric alignment members 102 extending through the first and second alignment openings 132, 134, it is understood that this arrangement is merely one possibility given the interchangeability of the concentric and acentric components of the alignment system 100, as discussed herein.

Figure 4:
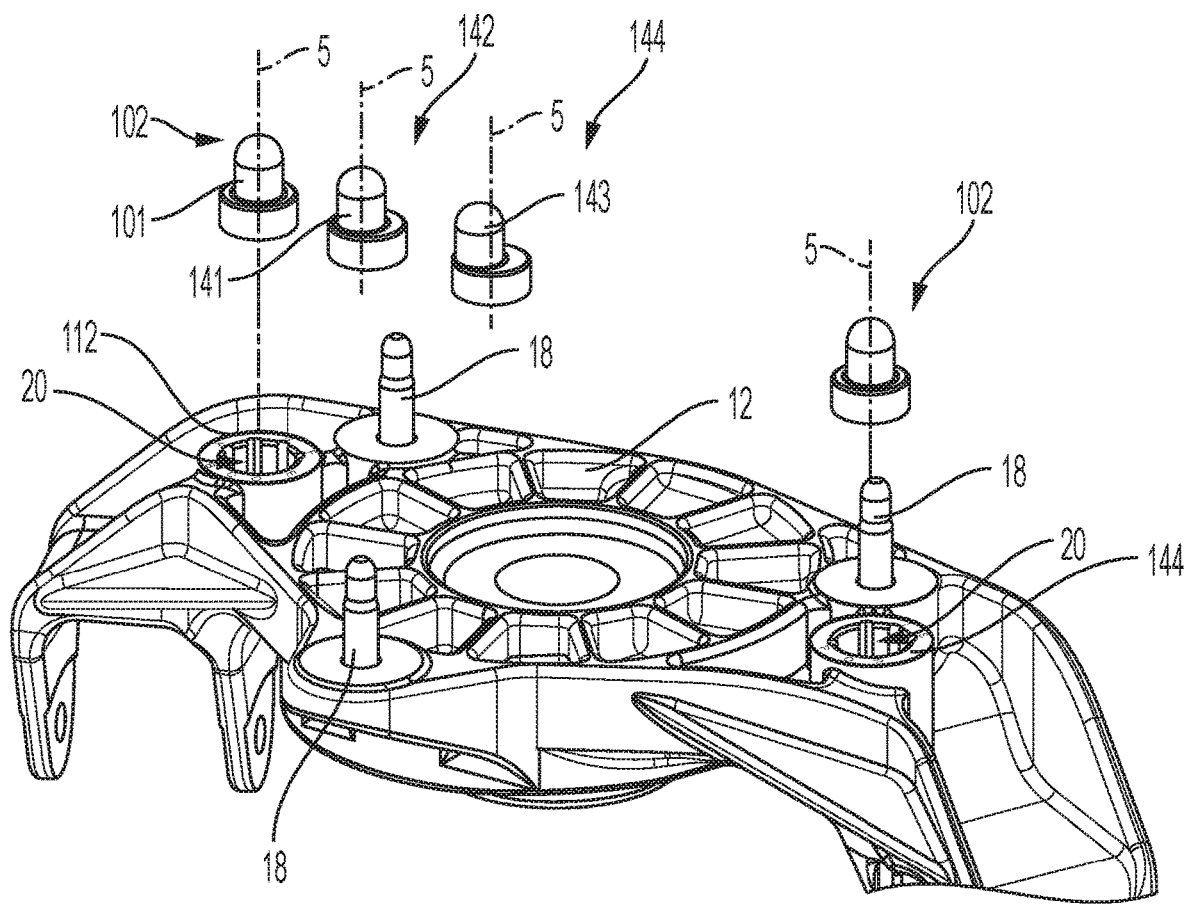
FIG. 4 is another schematic partial perspective view of the top mount of the vehicle suspension system of FIG. 1 illustrating components of an alignment system, according to an embodiment.
Figure 5:
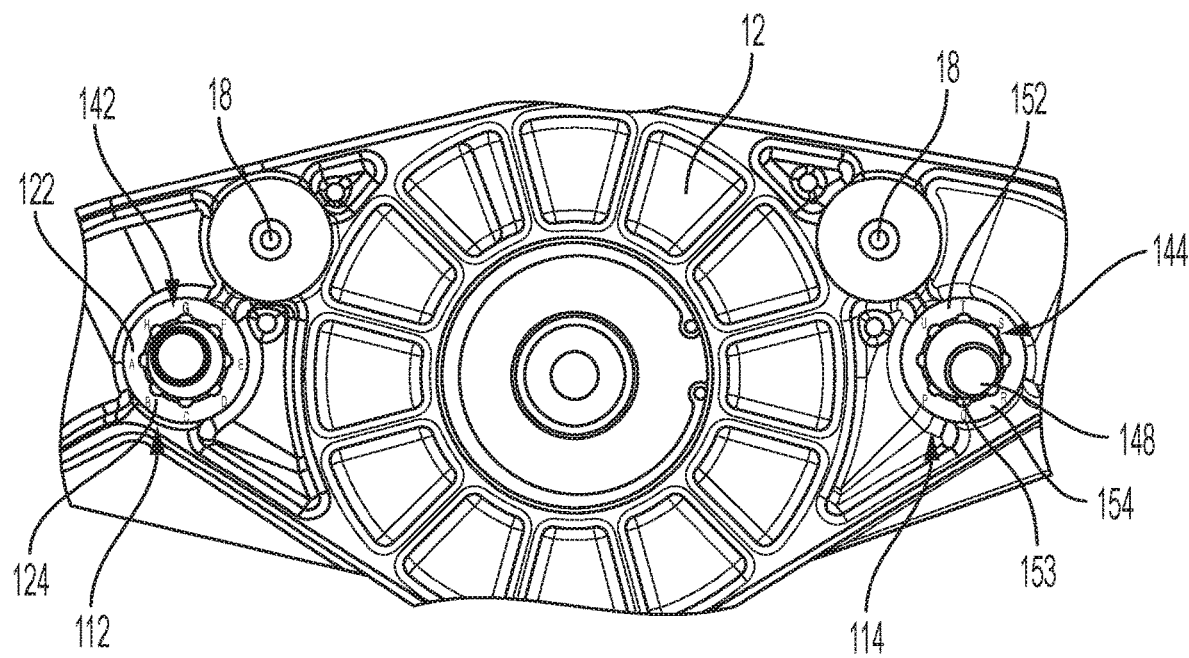
FIG. 5 is a schematic top view of the top mount of the vehicle suspension system of FIG. 1 illustrating components of an alignment system, according to an embodiment.
Figure 6:
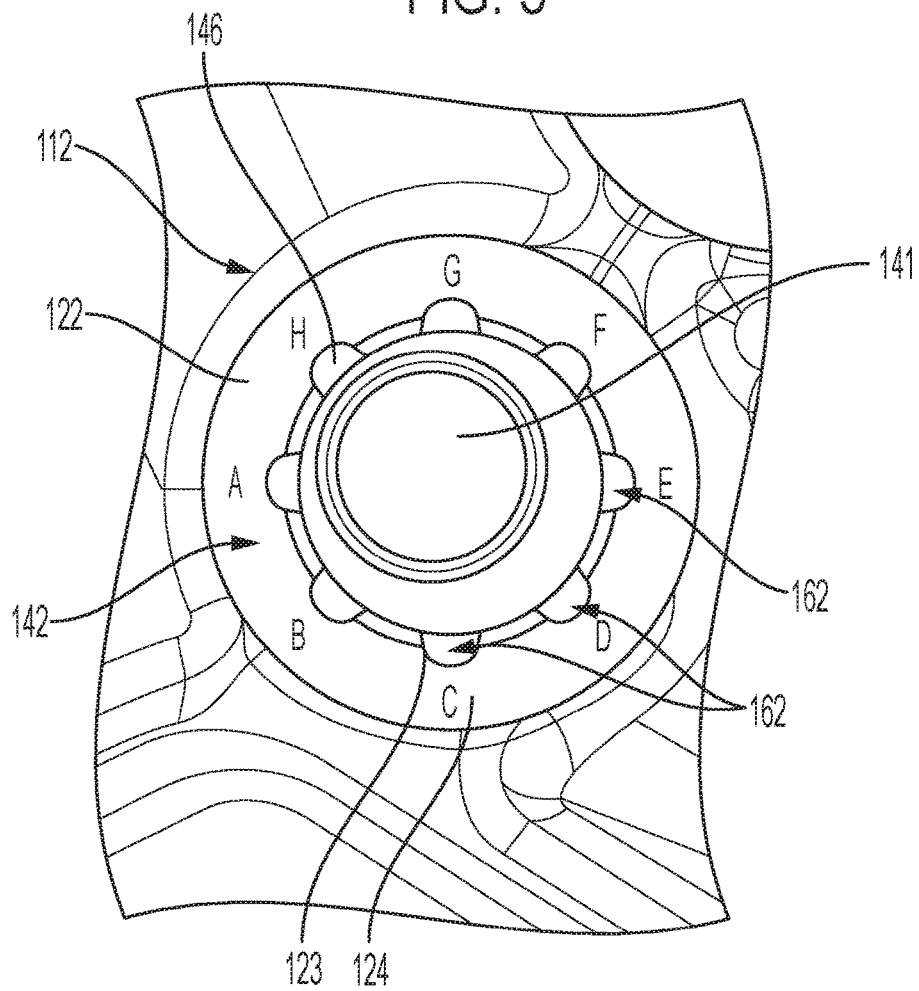
FIG. 6 is a schematic close view of an offset alignment member of the alignment system, according to an embodiment.

FIGS. 4-6 illustrate the alignment system 100 in greater detail. The alignment openings 20 are configured to receive the first and second alignment insert members 112, 114. In various embodiments, the alignment openings 20 are pockets or openings formed in the top mount 12. Each alignment opening 20 has a plurality of axial grooves 162 formed on the inside wall of the opening 20. In some embodiments, the grooves 162 are radially spaced at approximately 45-degree intervals, though in other embodiments, the grooves 162 may be spaced at different intervals. Each groove 162 is identified on the surface of the top mount 12 using an identifying marker or feature (not shown) that aligns with an identifying marker or feature on the alignment insert member 112, 114, as discussed below, to orient the alignment insert member in the alignment opening during installation.

With reference to FIGS. 5 and 6, details of the first and second alignment insert members 112, 114 are shown. FIG. 6 illustrates a detailed view of the first alignment insert member 112 with one of the acentric alignment members 142 inserted therein. The first alignment insert member 112 includes a radially-extending tab 122. The tab 122 extends radially outward from the alignment opening 20 and defines a circumference of the alignment opening 20. The tab 122 includes one or more notches 123. Each notch 123 is aligned with one of the grooves 162 formed on the inside wall of the alignment opening 20. Additionally, each notch 123 is identified by an identifying marker 124. In various embodiments, the identifying marker 124 is a letter, number, character, or other feature. The identifying marker 124 aligns with the corresponding groove 162 as identified by identifying markings on the top mount 12 (the identifying markings are hidden beneath the tab 122). The identifying marker 124 is used to distinguish the radial position of the notch 123 and insure correct installation of the first alignment insert member 112 within the alignment opening 20.

Similarly, the second alignment insert member 114 includes a radially-extending tab 152. The tab 152 extends radially outward from the alignment opening 20 and defines a circumference of the alignment opening 20. As discussed above with respect to the tab 122, the tab 152 includes one or more notches 153 and each notch 153 is aligned with the corresponding groove 162 formed on the inside wall of the alignment opening 20. Additionally, each notch 153 on the tab 152 similarly includes an identifying marker or feature 154 that aligns with the corresponding identifying marker or feature of the groove formed in the alignment opening 20. As with the identifying markers 124 of the tab 122, the identifying marker 154 is used to distinguish the radial position of the associated notch 153 and insure correct installation of the second alignment insert member 114 within the alignment opening 20.

In various embodiments, the alignment system 100 further includes one or more offset alignment members. To adjust the relative positioning of the top mount 12 and the vehicle body component 14, the concentric alignment members 102 may be interchanged with first and/or second offset alignment members 142, 144 (shown in FIGS. 4 and 5). As shown in FIG. 4, the concentric alignment members 102 are concentric pins; that is, the concentric locator pin component 101 is symmetric about a longitudinal axis 5 of the member. With continued reference to FIG. 4, the acentric locator pin component 141, 143 of the offset alignment members 142, 144 is offset either a first distance from the longitudinal axis 5 (see the acentric locator pin 141 of the first offset alignment member 142) or a second distance from the longitudinal axis 5 (see the acentric locator pin 143 of the second offset alignment member 144). In an exemplary embodiment, the acentric locator pin 141 of the first offset alignment member 142 is offset from the longitudinal axis 5 approximately 2 mm and the acentric locator pin 143 of the second offset alignment member 144 is offset from the longitudinal axis 5 approximately 4 mm. In various embodiments, the first and second offset alignment members 142, 144 are different colors from each other and from the concentric alignment members 102 to improve identification of the alignment member to be used during installation and assembly.

As best shown in FIGS. 5 and 6, the first offset alignment member 142 includes a locating member 146. The locating member 146 is an extension such as a nub or bump extending radially from the outer surface of the first offset alignment member 142. The locating member 146 identifies the radial position of the acentric locator pin 141 of the first offset alignment member 142; that is, the locating member 146 identifies the edge of the first offset alignment member 142 closest to the acentric locator pin 141. The locating member 146 is configured to be received within one of the notches 123 of the first alignment insert member 112. The first offset alignment member 142 can be rotated to a plurality of positions corresponding to the identified notches 123 of the first alignment insert member 112 to adjust the radial position of the acentric locator pin 141 of the first offset alignment member 142 with the alignment opening 20. The relative position between a first suspension component, such as the top mount 12, and a second component, such as the vehicle body component 14 is adjusted as the radial position of the first offset alignment member 142 is adjusted.

Similarly, the second offset alignment member 144 includes a locating member 148. The locating member 148 identifies the radial position of the acentric locator pin 143 of the second offset alignment member 144. Like the first offset alignment member 142, the second offset alignment member 144 can be rotated to a plurality of positions within the alignment opening 20 such that the locating member 148 is received within one of the notches 153 of the second alignment insert member 114.

In the exemplary embodiment shown in FIG. 5, the first offset alignment member 142 is oriented such that the locating member 146 is positioned toward the upper left. The second offset alignment member 144 is oriented such that the locating member 148 is positioned toward the lower right. While FIG. 5 illustrates the use of the first offset alignment member 142 in one alignment opening 20 and the second offset alignment member 144 in another alignment opening 20, it is understood that any combination of concentric alignment member 102, the first offset alignment member 142, and the second offset alignment member 144 may be used in the two or more alignment openings 20 to adjust a caster and camber alignment of the coupled components.

FIGS. 7-10 schematically illustrate the vehicle suspension system 10 including an alignment system 200 for adjusting the alignment of a vehicle suspension component coupled to a vehicle body component, according to an embodiment. In an exemplary embodiment, the alignment system 200 adjusts the relative position of a top mount 12 of a vehicle suspension coupled to a vehicle body component similar to that shown in FIGS. 1-6.

Figure 7:
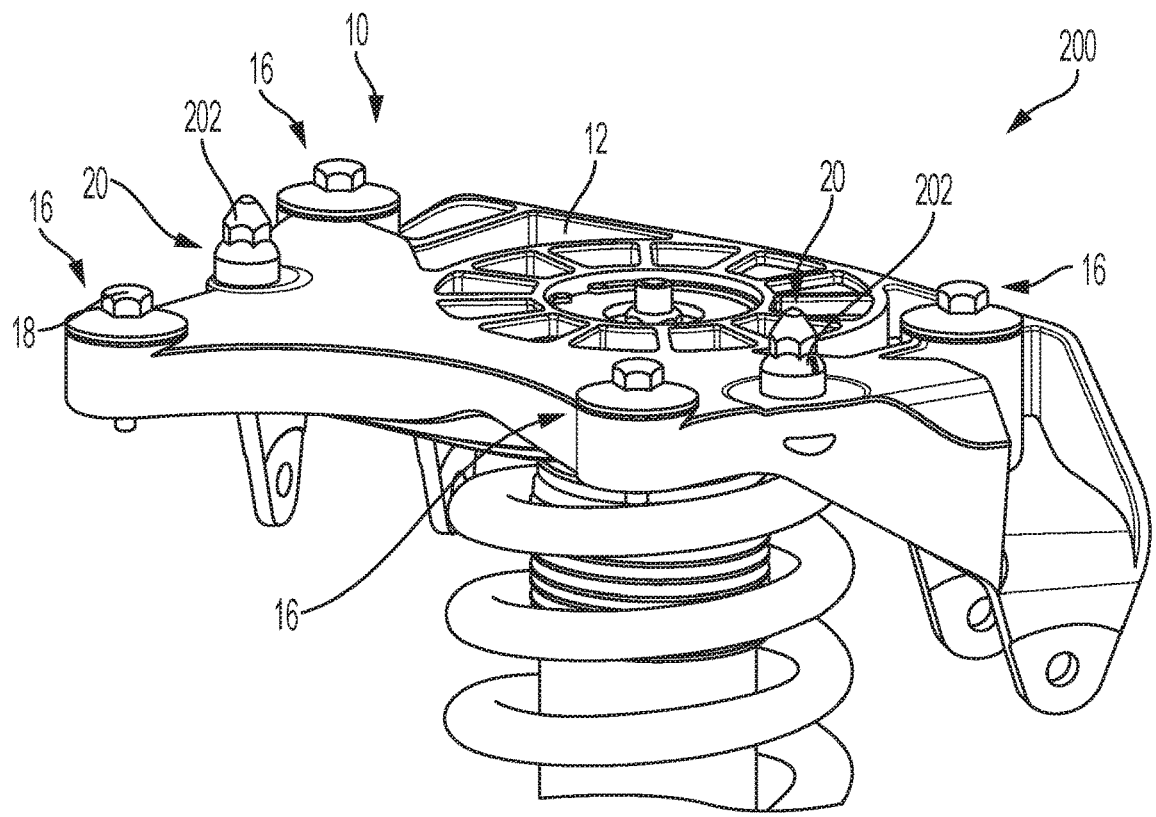
FIG. 7 is a schematic perspective view of a top mount of a vehicle suspension system illustrating components of an alignment system, according to an embodiment.

Referring now to FIG. 7, a closer view of the top mount 12 illustrating the alignment system 200 is shown. Like the embodiment shown in FIG. 2, the top mount 12 includes a plurality of attachment openings 16 and a plurality of alignment openings 20. In an exemplary embodiment, the top mount 12 includes four attachment openings 16 and two alignment openings 20. An attachment member 18 extends through each attachment opening 16. The attachment openings 16 are openings in the top mount 12 that are configured to receive the attachment member 18 such that the attachment member 18 extends above the surface of the top mount 12 to couple with a vehicle body component. In some embodiments, the attachment member 18 is seated within the attachment opening 16 using friction, adhesion, or any other attachment means. In some embodiments, the attachment member 18 is a stud, bolt, or other mechanical fastener.

In various embodiments, two eccentric alignment members 202 are used to locate the top mount 12 to the body (not shown), as illustrated in FIG. 7. In some embodiments, one alignment member 202 is used to align to a hole in the body and another alignment member is used to align to a slot in the body.

Figure 8:
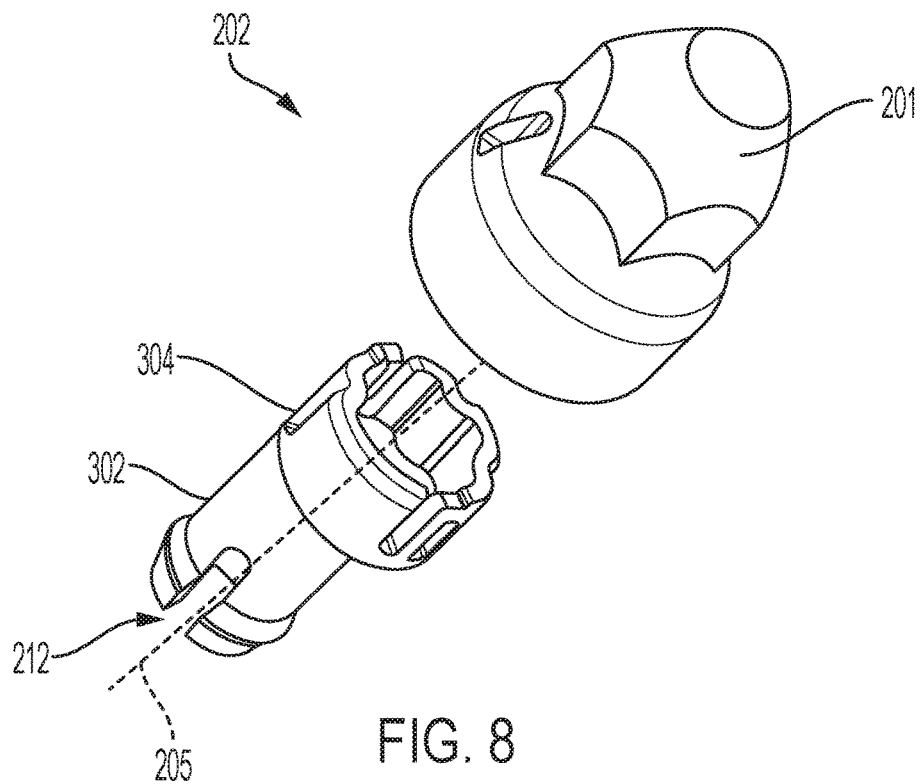
FIG. 8 is a schematic front perspective exploded view of components of the alignment system shown in FIG. 7, according to an embodiment.
Figure 9:
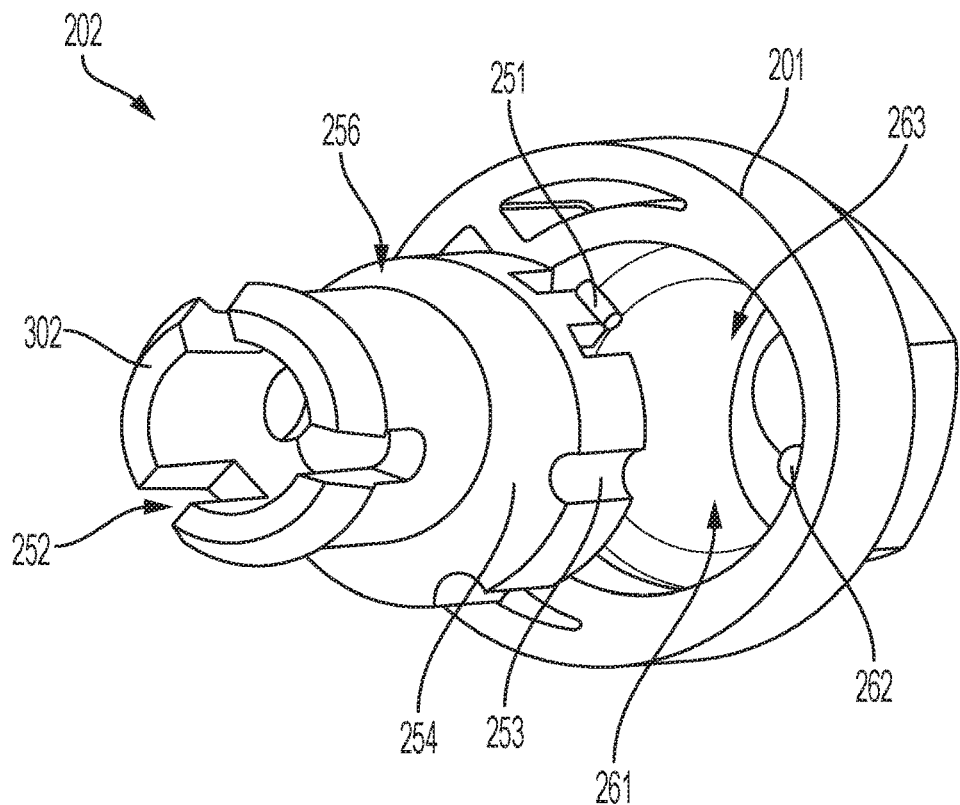
FIG. 9 is a schematic rear perspective exploded view of components of the alignment system shown in FIG. 8, according to an embodiment.
Figure 10:
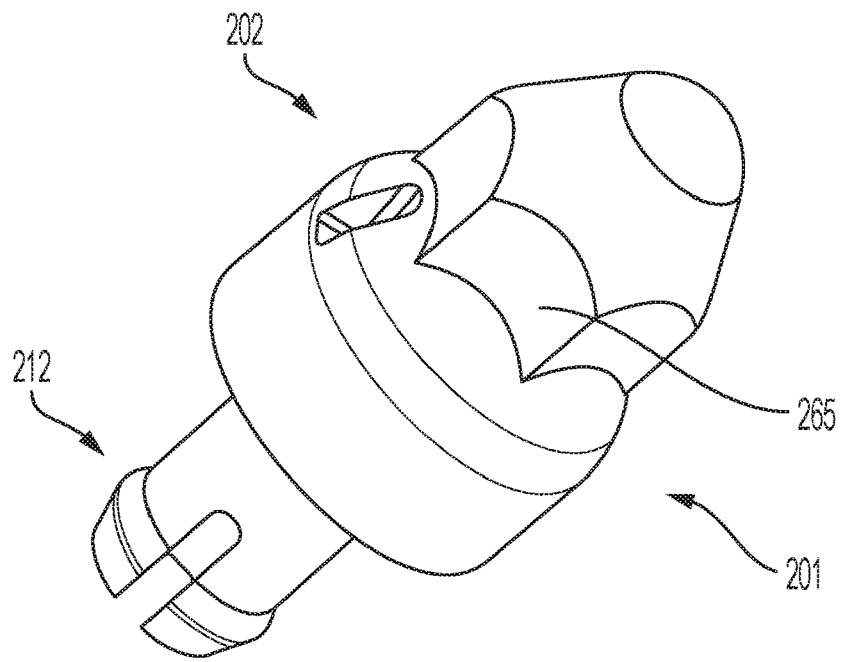
FIG. 10 is a schematic side perspective view of components of the alignment system shown in FIG. 8, according to an embodiment.

The alignment system 200 includes at least one eccentric alignment member 202. As shown in FIGS. 8-10, the eccentric alignment member 202 includes a guide cone 201 and an alignment insert member 212. In various embodiments, the guide cone 201 is a locating pin. The alignment insert member 212 includes a coupling portion 302 that is seated within the alignment opening 20 of the top mount 12 and an adjustment portion 304 opposite the coupling portion 302. The adjustment portion 304 of the alignment insert member 212 is seated within the guide cone 201. The coupling portion 302 of the alignment insert member 212 is offset relative to a longitudinal axis 205 of the member 212. Additionally, the coupling portion 302 includes at least one notch 252 to facilitate installation of the alignment insert member 212 into the alignment opening 20.

The adjustment portion 304 of the alignment insert member 212 is received within an opening 261 defined by an interior surface 263 of the guide cone 201. The adjustment portion 304 includes a snap retention feature including at least one tab 251 configured to couple the alignment insert member 212 to the guide cone 201. Additionally, the adjustment portion 304 of the alignment insert member 212 has a larger radius than the coupling portion 302. An edge surface 256 of the adjustment portion 304 extends radially outward of and perpendicular to the surface of the coupling portion 302. The edge surface 256 includes at least one notch 253. Like the notches 153 discussed above with respect to the alignment system 100, each notch 253 includes an identifying marker or feature 254. The identifying marker or feature 254 corresponds with a desired offset position of the eccentric alignment member 202. The notch 253 may be aligned with a projection 262 formed on the interior surface of the guide cone 201 depending on the desired orientation of the eccentric alignment member 202. The interface between the projection 262 and notch 253 of the selected offset position of the alignment member 202 maintains the radially position of the guide cone 201 relative to the alignment insert member 212.

Additionally, in some embodiments, the guide cone 201 includes a faceted outer surface 265, as shown in FIG. 10. The faceted outer surface 265 allows for adjustment and rotation of the eccentric alignment member 202 using a wrench or other suitable tool.

In various embodiments, the identifying marker or feature 254 identifies an offset of 0, 2, or 4 mm. However, in other embodiments, the eccentric alignment member 202 may include other offset adjustments depending on the desired alignment geometry.

In some embodiments, a calibration table is used to determine the combination of alignment members (whether concentric and/or acentric) and the orientation of the locating member of each alignment member within the alignment insert member of the alignment system 100 that will achieve the desired caster and camber geometry of the vehicle when the suspension components are joined together during assembly. Similarly, a calibration table is used to determine the optimal guide cone offset and orientation combination of the alignment system 200 to achieve the desired alignment geometry. In various embodiments, the calibration table is based on vehicle characteristics such as the vehicle geometry, configuration, weight, suspension characteristics, etc., for example and without limitation.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context dearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An alignment system, comprising:
   at least one concentric alignment member having a concentric locator pin;
   at least one offset alignment member having an acentric locator pin and a locating member identifying a radial position of the acentric locator pin; and
   at least one alignment insert member configured to receive one of the at least one concentric alignment member and the at least one offset alignment member, the alignment insert member including a radially-extending tab having a plurality of notches distributed radially along the tab, each of the plurality of notches configured to receive the locating member;
   wherein the at least one concentric alignment member is interchangeable with the at least one offset alignment member, and the at least one offset alignment member is rotatable within the at least one alignment insert member to adjust a radial position of the acentric locator pin.

2. The alignment system of claim 1, wherein each of the plurality of notches of the radially-extending tab includes an identifying marker configured to identify a radial position of a notch of the plurality of notches such that engagement of the locating member within the notch establishes the radial position of the acentric locator pin of the offset alignment member.

3. The alignment system of claim 1 wherein the at least one alignment insert member comprises a first alignment insert member configured to adjust a caster alignment and a second alignment insert member configured to adjust a camber alignment.

4. A vehicle suspension system, comprising:
an alignment system comprising
a plurality of interchangeable alignment members; and
an alignment insert member configured to receive one of the plurality of interchangeable alignment members, the alignment insert member including a radially-extending tab having a plurality of notches distributed along the tab;
a first suspension component including an alignment opening configured to receive the alignment insert member, the alignment opening having a plurality of axial grooves formed on an interior surface of the alignment opening, each of the plurality of axial grooves aligned with one of the plurality of notches of the alignment insert member; and
a vehicle body component having at least one opening configured to receive one of the plurality of interchangeable alignment members;
wherein each of the plurality of interchangeable alignment members is rotatable within the alignment insert member to adjust a position of the first suspension component relative to the vehicle body component.

5. The vehicle suspension system of claim 4, wherein the plurality of interchangeable alignment members includes a concentric alignment member, a first offset alignment member, and a second offset alignment member, the concentric alignment member including a concentric locator pin, the first offset alignment member including a first acentric locator pin and a first locating member identifying a position of the first acentric locator pin, and the second offset alignment member including a second acentric locator pin and a second locating member identifying a position of the second acentric locator pin.

6. The vehicle suspension system of claim 5, wherein the first locating member is an extension extending radially from an outer surface of the first offset alignment member and the second locating member is an extension extending radially from an outer surface of the second offset alignment member.

7. The vehicle suspension system of claim 4, wherein the alignment opening is a first alignment opening and the alignment insert member is a first alignment insert member and the first alignment opening is configured to receive the first alignment insert member, and the vehicle suspension system further comprises a second alignment insert member and the first suspension component includes a second alignment opening configured to receive the second alignment insert member.

8. The vehicle suspension system of claim 7, wherein the first alignment opening includes a plurality of first axial grooves formed on an interior surface of the first alignment opening and the second alignment opening includes a plurality of second axial grooves formed on an interior surface of the second alignment opening.

9. The vehicle suspension system of claim 8, wherein the first alignment insert member includes a first radially-extending tab having a plurality of first notches, each of the plurality of first notches including an identifying marker to identify the radial position of the notch and each notch aligns with a corresponding one of the plurality of first axial grooves of the first alignment opening.

10. The vehicle suspension system of claim 9, wherein the second alignment insert member includes a second radially-extending tab having a plurality of second notches, each of the plurality of second notches including an identifying marker to identify the radial position of the notch and each notch aligns with a corresponding one of the plurality of second axial grooves of the second alignment opening.

11. The vehicle suspension system of claim 10, wherein the plurality of interchangeable alignment members includes a concentric alignment member having a concentric locator pin, a first offset alignment member having a first acentric locator pin and a first locating member identifying a position of the first acentric locator pin, and a second offset alignment member having a second acentric locator pin and a second locating member identifying a position of the second acentric locator pin, the first locating member is an extension extending radially from an outer surface of the first offset alignment member and the second locating member is an extension extending radially from an outer surface of the second offset alignment member, and the first locating member engages with a notch of plurality of first notches to adjust a radial position of the first acentric locator pin and the second locating member engages with a notch of the plurality of second notches to adjust a radial position of the second acentric locator pin.

12. A system for aligning a relative position between two components, comprising:
a locating member comprising a guide cone; and
an alignment insert member configured to couple with the locating member, the alignment insert member including a coupling portion, an adjustment portion opposite the coupling portion, and a radially-extending tab having a plurality of identifying markers to identify a radial position of the locating member;
wherein the locating member is rotatable within the alignment insert member to adjust a radial position of the locating member and the adjustment portion of the alignment insert member is configured to interface with the guide cone of the locating member in one or more of a plurality of radial positions.

13. The system of claim 12, wherein the guide cone includes an interior surface defining an opening configured to receive the alignment insert member and the adjustment portion of the alignment insert member includes a radially-extending edge surface including a plurality of notches identified by a plurality of identifying markers, each identifying marker corresponding to a desired position of the guide cone.

14. The system of claim 13, wherein the guide cone includes a projection extending from the interior surface, the projection configured to interface with one of the plurality of notches of the alignment insert member.

15. The system of claim 12, wherein the alignment insert member comprises a plurality of interchangeable alignment members and the plurality of interchangeable alignment members includes a concentric alignment member having a concentric locator pin, a first offset alignment member having a first acentric locator pin and a first locating member identifying a position of the first acentric locator pin, and a second offset alignment member having a second acentric locator pin and a second locating member identifying a position of the second acentric locator pin.

16. The system of claim 15, wherein the first locating member is an extension extending radially from an outer surface of the first offset alignment member and the second locating member is an extension extending radially from an outer surface of the second offset alignment member.

17. The system of claim 16, wherein the radially-extending tab of the alignment insert member includes a notch configured to receive one of the first and second locating members.

\* \* \* \* \*